United States Patent [19]

Brammer et al.

[11] Patent Number: 5,798,453
[45] Date of Patent: Aug. 25, 1998

[54] PRESSURE SLEEVE

[75] Inventors: Hartmut Brammer, Vaihingen; Friedrich Jaki, Erdmannhausen; Uwe Hackel, Gerlingen; Holger Krebs, Erdmannhausen, all of Germany

[73] Assignee: Robert Bosch GmbH, Stuttgart, Germany

[21] Appl. No.: 674,544

[22] Filed: Jul. 2, 1996

[30] Foreign Application Priority Data

Jul. 3, 1995 [DE] Germany .......... 195 24 152.5

[51] Int. Cl.⁶ .................................. G01L 23/22
[52] U.S. Cl. .......... 73/35.09; 73/35.07; 73/35.11
[58] Field of Search .......... 73/35.01, 35.07, 73/35.09, 35.12, 35.11, 116, 117.2, 117.3, 593, 666

[56] References Cited

U.S. PATENT DOCUMENTS

| | | | |
|---|---|---|---|
| 4,944,179 | 7/1990 | Komurasaki | 73/35.11 |
| 4,964,294 | 10/1990 | Kawajiri et al. | 73/35.11 |
| 4,978,883 | 12/1990 | Komurasaki | 73/35.11 |
| 5,144,837 | 9/1992 | Komurasaki et al. | 73/35.11 |
| 5,150,606 | 9/1992 | Komurasaki | 73/35.09 |
| 5,398,540 | 3/1995 | Entenmann et al. | 73/35.11 |
| 5,440,933 | 8/1995 | Brammer et al. | 73/35.11 |

*Primary Examiner*—George M. Dombroske
*Assistant Examiner*—Eric S. McCall
*Attorney, Agent, or Firm*—Michael J. Striker

[57] ABSTRACT

A pressure sleeve for a vibration pickup, has a body part with a central opening for a mounting element and a supporting surface to be placed on a component causing vibrations, a detecting element arranged radially outwardly on the body part with an axial pretensioning, a spring providing the axial pretensioning of the detecting elements, and an abutment provided on the body part for the spring, the abutment including at least two curved portions provided on an outer peripheral of the body part and formed by wedging of a material of the body part.

11 Claims, 2 Drawing Sheets

PRESSURE SLEEVE

BACKGROUND OF THE INVENTION

The present invention generally relates to pressure sleeves, in particular for a vibration pickup.

Pressure sleeves of the above mentioned general type are known in the art. One of such pressure sleeves is disclosed in German document DE-OS 44 03 660. This pressure sleeve is utilized for knocking sensors in internal combustion engines. The pressure sleeve is placed firmly through a supporting region on a component whose vibrations must be detected. The vibrations to be detected are knocking noises of the internal combustion engine during operations. They are transmitted through the pressure sleeve to a piezo-ceramic vibration pickup as a knocking sensor and converted into an evaluatable output signal. The type of arranging or clamping the knocking sensor in the pressure sleeve and the mounting on the vibrating component has a great influence both on the manufacture as well as on the eventual faulty measurements and disturbances in the connected evaluating circuit during the operation.

The known pressure sleeve as a rule is composed of a very resistant and hard material, such as for example steel, to provide accurate measurements even in condition of relatively great pressures and temperatures. The housing which surrounds the pressure sleeve and the sensor itself together with its clamping means is composed as a rule of synthetic plastic material, such as for example polyurethane (PUR) or glass-fiber reinforced polyamide (PA66 GF35). It is known for example from the European Patent Document EP 0 211 019 B1 that such different parts can be fixably connected with one another through correspondingly designed thread constructions and this connection is not substantially affected by temperature actions.

SUMMARY OF THE INVENTION

Accordingly, it is an object of present invention to provide a pressure sleeve of the above-mentioned general type, which is a further improvement of the inventive pressure sleeves.

In keeping with these objects and with others which will become apparent hereinafter, one feature of present invention resides, briefly stated, in a pressure sleeve which has an abutment surface to be positioned on a component causing vibrations, detecting means held radially outwardly on the pressure sleeve under an axial pretensioning, and an abutment provided on the pressure sleeve for a spring which provides pretensioning, wherein in accordance with the present invention the abutment is composed of two curved portions provided on the outer periphery of the pressure sleeve and produced by wedging of the material of the pressure sleeve.

When the pressure sleeve is designed in accordance with present invention, the abutment for the spring which provides the prestress is formed in a simple manner by wedging of the pressure sleeve above the spring.

In accordance with another feature of present invention, a radially clampable safety ring or a spring ring can be arranged between the spring and the curved portion. In this construction the abutment for the spring which provides pretensioning is obtained by wedging the pressure sleeve above the additional ring.

With the curved portions produced by wedging, which can include five wedge points distributed over the periphery, an especially reliable holding of the full arrangement with the detecting means on the pressure sleeve is provided. With the inventive arrangement it is guaranteed that because of the elimination of material-removing processing steps, for example cutting of threads for the safety threaded ring, a simple and reliable manufacturing method can be utilized and post-machining with a complicated material-removing operation is dispensed with. Because of the degree of the wedging, the pretensioning of the piezo-ceramic (detection means) can be adjusted.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
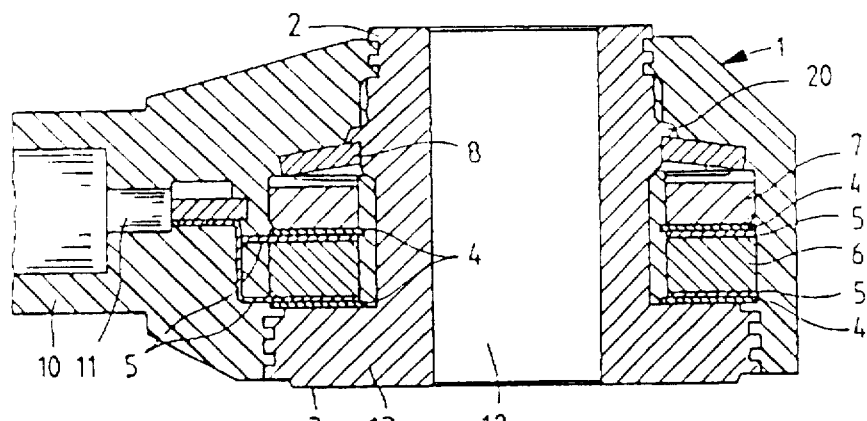
FIG. 1 is a view showing a longitudinal section through a knocking sensor housing with a pressure sleeve and a wedging over a spring in accordance with present invention.
Figure 2:
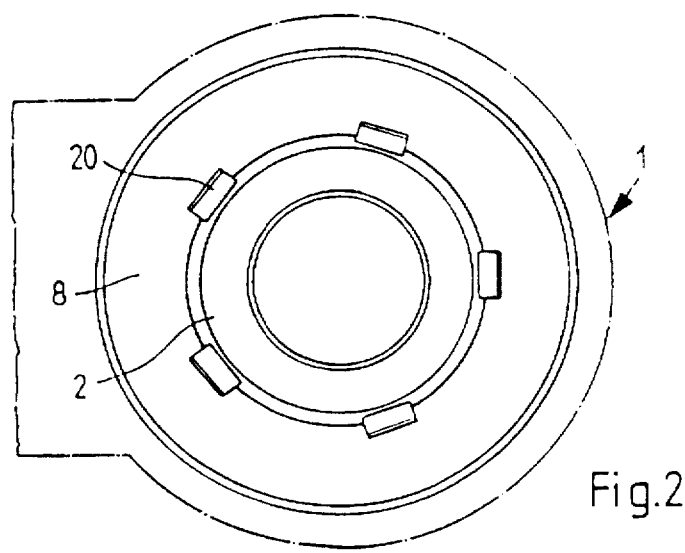
FIG. 2 is a view showing a cross-section through the pressure sleeve of FIG. 1 in accordance with the present invention.

A knocking sensor for an internal combustion engine is shown in FIG. 1 and has a housing identified with reference numeral 1. A pressure sleeve 2 is arranged in the housing 1 and has an abutment surface 3 for placing on a not shown housing of a motor, whose vibrations must be detected. The pressure sleeve 2 has an outer periphery and a plurality of parts arranged on the periphery. Starting from the lower supporting surface 3, the parts arranged on the pressure sleeve include an insulating disk 4, a contact disk 5, a piezo-ceramic disk 6 which forms detecting means, and moreover a second contact disk 5 as well as a second insulating disk 4. A seismic mass 7 is arranged on this set and pressed in direction towards the piezo-ceramic disk 6 by a cup spring 8. Curved portions 20 form an abutment for the cup spring 8 as can be clearly seen from FIG. 2. There are five such curved portions which are uniformly distributed over the periphery of the pressure sleeve 2.

The housing 1 has an integrated connection part 10 which is composed of a synthetic plastic material and produced by injection molding. A connection cable 11 is injection-molded in the connection part 10. The conductors of the connecting cable 11 are connected with two contact disks 5 at both sides of the piezo-ceramic disk 6 and transmit the electric voltage which is produced in response to a pressure loading of the piezo-ceramic disk 6. A not shown mounting screw extends through a central recess or an opening 12 in the pressure sleeve 2 and mounts the knocking sensor directly or indirectly on the housing of the internal combustion engine.

With the mounting of the knocking sensor, the total torque applied by the mounting screw is transferred to the pressure sleeve 2. In other words, no force acts on the piezo-ceramic disk 6 during the mounting. A pretensioning force is produced by abutting of the cup spring 8 against the curved portions 20 formed on the periphery of the pressure sleeve 2 by wedging. Thereby the whole set of the parts 4, 5, 6, 7 is pressed against the projecting region 13 of the pressure sleeve 2 and the important parts of the whole vibration pickup are held in their initial position.

The pretensioning force is selected so that axial forces act on the piezo-ceramic disk 6 directly without worsening of its electrical signal, and they are independent from thermal expansions as well as unavoidable compressions of the pressure sleeve 2 during mounting. The pulses applied by the seismic mass 7 proportionally to the vibrations of the internal combustion engine are converted in the piezo-ceramic disk 6 into voltage pulses. This voltage pulses are readable in a corresponding measuring device or supported to an indicating device.

Figure 3:
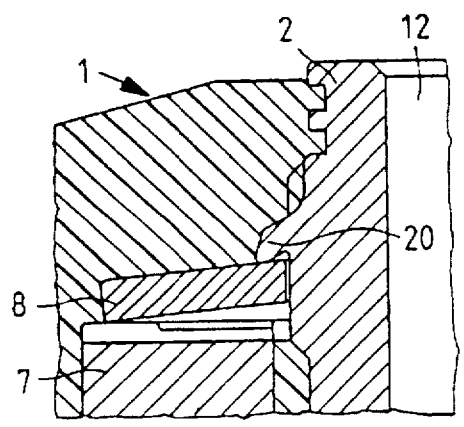
FIG. 3 is a view showing a section of a detail of the pressure sleeve shown in FIG. 1.

FIG. 3 shows in detail the pressure sleeve 2 in the region of the abutment formed by the curved portion 20.

Figure 4:
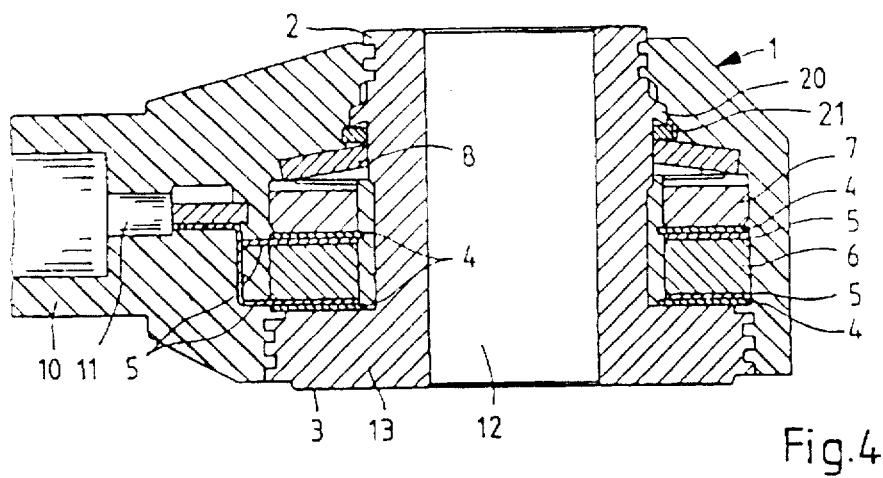
FIGS. 4–6 are views substantially corresponding to the views of FIG. 1, but showing an additional ring provided over the spring.
Figure 5:
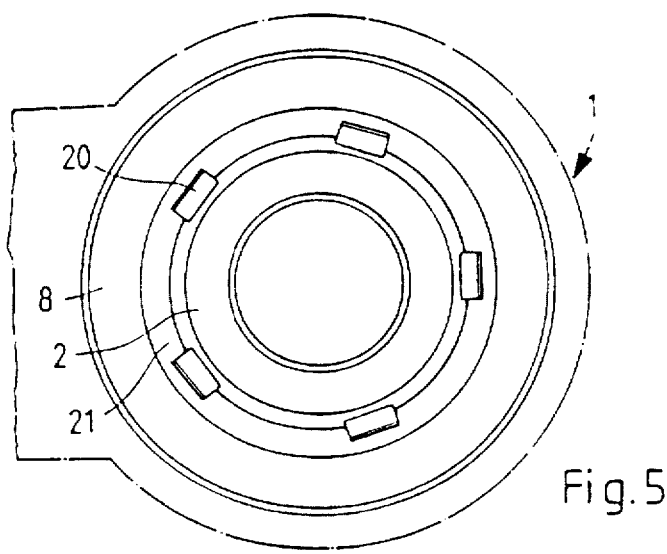
Figure 6:
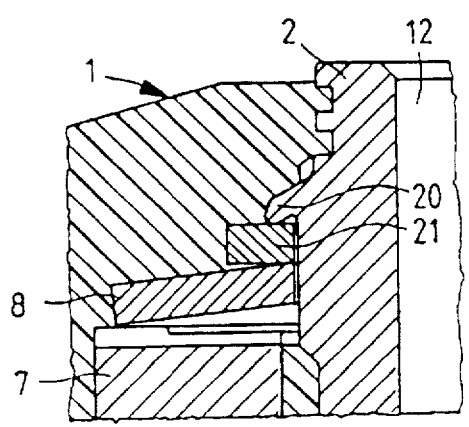

FIGS. 4–6 show the pressure sleeve 2 in accordance with another embodiment. An additional ring 21 is arranged between the curved portions 20 and the cup spring 8. Since all other features of the pressure sleeve of FIGS. 4–6 correspond to the features of FIGS. 1–3, the same reference numerals are utilized in these figures.

The ring utilized in the inventive pressure sleeve can be formed as a radially clampable safety ring 21, or can be formed as a spring ring. The pressure sleeve can be composed of steel or brass. The supporting surface 3 of the pressure sleeve, between the opening for the mounting means and the radially outer edge, can have an increasing incline without an angle between 0.5° and 1.5°.

It will be understood that each of the elements described above, or two or more together, may also find a useful application in other types of constructions differing from the types described above.

While the invention has been illustrated and described as embodied in pressure sleeve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure sleeve for a vibration pickup, comprising a body part having a central opening for a mounting element and a supporting surface to be placed on a component causing vibrations; detecting means arranged radially outwardly on said body part with an axial pretensioning; a pressure spring located between said body part and said detecting means and providing said axial pretensioning of said detecting means and providing said axial pretensioning of said detecting means, said body part having an outer periphery provided with at least two curved portions located at a distance from one another, said pressure spring abutting against said curved portions of said body part.

2. A pressure sleeve as defined in claim 1, wherein said abutment includes five said curved portions distributed over the periphery of said body part.

3. A pressure sleeve as defined in claim 1, wherein said spring abut directly against said curved portions.

4. A pressure sleeve as defined in claim 1; and further comprising a ring arranged between said spring and said curved portion.

5. A pressure sleeve as defined in claim 4, wherein said ring is formed as a safety ring.

6. A pressure sleeve as defined in claim 4, wherein said ring is formed as a spring ring.

7. A pressure sleeve as defined in claim 1, wherein said body part is composed of steel.

8. A pressure sleeve as defined in claim 1, wherein said body part is composed of brass.

9. A pressure sleeve as defined in claim 1, wherein said detecting means includes a piezo-ceramic disk.

10. A pressure sleeve as defined in claim 1, wherein said supporting surface between said opening for the mounting means and a radially outer edge has an increasing incline with an angle of substantially between 0.5° and 1.5°.

11. A pressure sleeve as defined in claim 1, wherein said supporting surface of said body part is formed so that said supporting surface is placeable on a component of a motor block of an internal combustion engine which causes vibrations.

* * * * *